United States Patent [19]

Namba et al.

[11] 4,358,295
[45] Nov. 9, 1982

[54] POLISHING METHOD

[75] Inventors: Yoshiharu Namba, Hirakata; Taketoshi Yonezawa, Minoo, both of Japan

[73] Assignee: Matsushita Electric Industrial Co., Ltd., Kadoma, Japan

[21] Appl. No.: 134,635

[22] Filed: Mar. 27, 1980

[51] Int. Cl.³ .............................................. C09K 3/14
[52] U.S. Cl. ......................................... 51/309; 106/3
[58] Field of Search .............................. 51/309; 106/3

[56] References Cited

U.S. PATENT DOCUMENTS

| 3,817,727 | 6/1974 | Yancey | 51/309 |
| 4,021,263 | 5/1977 | Rosenblum | 51/309 |
| 4,022,625 | 5/1977 | Shelton | 106/3 |
| 4,162,899 | 7/1979 | Molnar et al. | 51/309 |
| 4,242,842 | 1/1981 | Yancey | 51/309 |

OTHER PUBLICATIONS

Yoshiharu Namba et al., Ultra-Fine Polishing of Mn-Zn Ferrite and Magnetic Characteristic of Same, Department of Technology, Osaka University, Osaka, Japan, Mar. 3, 1978, pp. 1-6.

Primary Examiner—Donald E. Czaja
Assistant Examiner—W. Thompson
Attorney, Agent, or Firm—Stevens, Davis, Miller & Mosher

[57] ABSTRACT

A polishing method suitable for use in working a surface of a magnetic material such as materials of magnetic head into a mirror-finished surface. The work is placed in a treating liquid cell such that its surface to be worked is opposed by the surface of a lap. The treating liquid contains fine polishing grains of magnesium oxide as the polishing agent, by an amount less than 4 wt %, and may contain 10 to 30 wt % of glycerol for increasing the viscosity. As a relative movement occurs between the work and the lap, the treating liquid forms a state of a dynamic-pressure bearing between the opposing surfaces of the work and lap, so that the surface of the work is polished into mirror surface by the action of the magnesium oxide without contacting the lap directly.

1 Claim, 15 Drawing Figures

POLISHING METHOD

BACKGROUND OF THE INVENTION

The present invention relates to a method of polishing the surface of a work into a mirror surface.

Recently, materials for electronic parts are mostly required to have mirror-finished surface free of disorder of crystalline structure or residual stress. In the semiconductor material such as single crystal of silicon or the like, a chemical polishing is effected as the final processing, making positive use of the high purity of the single crystal. However, most of materials for industrial use are polycrystal materials and are not entirely free from the presence of impurities. If such materials are subjected to a chemical polishing, steps are formed at the grain boundaries due to anisotropy of the crystals or the elution or residue of the impurities takes place so that it is not possible to form a mirror-finished surface.

In the conventional mirror-finishing method for metallic products such as rolls, which surfaces are removed while attaining an amorphous state of the surface, the hardness of the material is increased, or the fatigue rupture strength is increased. This method, therefore, can advantageously be used for certain purposes. In case of the materials of electronic parts, however, it is essential to form a mirror-finished surface without altering the nature of the material itself so that the conventional mirror-finishing process cannot apply satisfactorily.

SUMMARY OF THE INVENTION

It is, therefore, an object of the invention to provide a polishing method capable of easily forming an almost perfect mirror-finished surface of materials for electronic parts.

To this end, according to the invention, there is provided a polishing method comprising the step of moving the surface of a work to be processed and a lap relatively to each other in a processing liquid having a suspension of magnesium oxide particles, such that the surface of the work to be processed and the lap are suspended in the state of dynamic-pressure fluid bearing, whereby the surface of the work is mirror-finished by the magnesium oxide particles.

The method of the invention is applicable to the mirror-finishing of various materials for electronic parts, which are required to have mirror-finished surface having no disorder of crystalline structure or residual stress. More particularly, the method of the invention can be suitably used for mirror-finishing of ferrite materials having high magnetic permeability such as Mn-Zn ferrite, Ni-Zn ferrite or the like suitably used as the material of magnetic head and metallic magnetic material such as sendust.

The above and other objects, as well as advantageous features of the invention will become more clear from the following description of the preferred embodiments taken in conjunction with the accompanying drawings.

DESCRIPTION OF THE PREFERRED EMBODIMENTS

The invention will be described hereinafter with reference to the drawings showing an embodiment of the invention in which the working method of the invention is applied to the polishing of ferrite, particularly the gap surface of a magnetic head.

Before turning to the description of the embodiments, a description will be made hereinunder as to the conventional working method, in order to clarify the drawbacks of the prior art and, hence, the technical subject to be achieved by the invention, as well as the advantages of the invention over the prior art.

Ferrite is a metal oxide magnetic material broadly used as the material of electronic parts. Particularly, ferrites having high magnetic permeability such as, Mn-Zn ferrite and Ni-Zn ferrite are used as the magnetic core material for magnetic head, due to their superior frequency characteristics. A specifically high precision is required for the working of these materials. The demand for higher precision is becoming more severe due to a current remarkable progress in the magnetic recording technic which practically permits a recording and reproduction of recording signals of wave lengths of not greater than 1 $\mu$m. The most important point in the manufacture of the magnetic head is the mirror-finishing of opposing gap surfaces defining the magnetic gap. The size of the gap has become small following up the reduction of the wave length of the recording signal. In fact, in the currently developed recording system, the wave length is as small as 1 $\mu$m or less so that the magnetic gap has to be correspondingly small. Therefore, the surfaces defining the magnetic gap have to be mirror-finished almost perfectly.

Particularly, in case of ferrite the magnetic characteristic of which is highly sensitive to the crystalline structure and stress, a serious deterioration of the magnetic characteristic may be caused by an inadequate processing.

Figure 1:
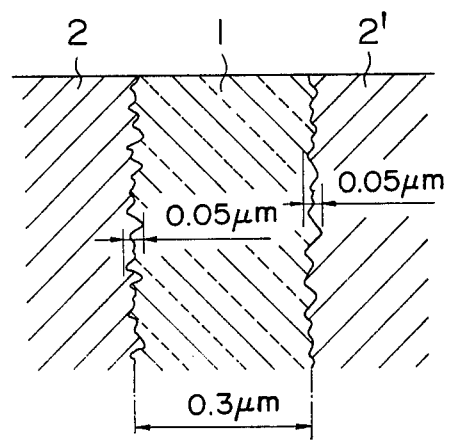
FIG. 1 is a detailed illustration of a magnetic head gap of a magnetic head processed by a conventional method.

The gap surfaces of the magnetic head are usually mirror-finished by lapping or polishing. The most typical conventional polishing method employs a soft metal such as tin, lead or the like as the lap and diamond particles of mean grain size of 3 $\mu$m or smaller as the abrasive grain. This method permits the surface roughness of less than 0.05 $\mu$m. From a macroscopic point of view, this surface roughness provides a highly mirror-finished gap surfaces of the magnetic head. However, from a microscopic view, the mean roughness of 0.05 $\mu$m is not negligible for a mean gap length of 0.3 $\mu$m, as will be seen from FIG. 3, and considerably deteriorates the frequency characteristic of the magnetic head. In FIG. 1, a reference numeral 1 denotes a non-magnetic spacer for forming a gap, e.g. glass which is formed by evaporation or spattering, whereas 2, 2' denote ferrite cores.

Various reports have been made as to the affect of conventional polishing method on the ferrite and a consequent deterioration of magnetic characteristic. In fact, the present inventors have confirmed the presence of a work-affected layer of a depth to 0.3 $\mu$m extent.

Figure 2:
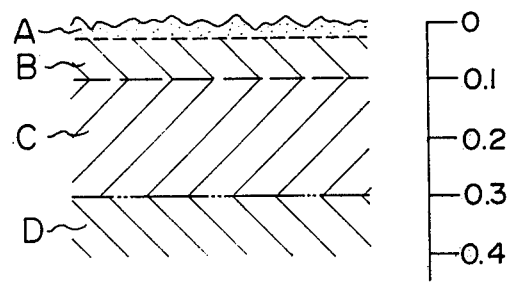
FIG. 2 shows a work affected layer of a magnetic head processed by a conventional method.

FIG. 2 shows, by way of example, the state of the work-affected layer in the surface area of Mn-Zn single crystal ferrite (100). The region of a depth of 0.02 to 0.03 $\mu$m from the work surface is an amorphous layer A referred to as Beilby layer which is considered to have lost the magnetic characteristic. A layer B under the amorphous layer A has fine crystals and attains a depth of about 0.1 $\mu$m. The strain-containing layer C under the fine crystal layer B has various crystal defects such as dislocation, slip and the like and attains a depth of about 0.03 $\mu$m. A crystalline structure layer D under the strain-containing layer C can be regarded as being material bulk. The magnetic characteristic is recovered gradually in successive layers from the fine crystal layer B to the strain-containing layer C as the depth becomes greater but the magnetic characteristic (for example, magnetic permeability) inherently possessed by the ferrite cannot be observed even in the bulk layer D. This is because a tensile stress, which balances a large residual compression stress in the work-affected layer, causes an elastic deformation in the bulk layer.

Thus, the gap constituted by the surfaces having such work-affected layer is magnetically greater than the actual mechanical size. In addition, the sharpness of magnetic characteristic at the gap edge has been lost so as to deteriorate the high-frequency characteristic of the magnetic head. Namely, in case of gap surfaces of the magnetic head for high-density signal recording, it is necessary that the surface roughness is negligibly small, e.g. 0.01 $\mu$m or smaller for a gap of 0.3 $\mu$m, and that there is almost no work-affected layer. To meet these requirements, it is a common measure to use extremely fine grains of a alumina or the like. The result of the tests conducted by the inventors, however, shows almost no improvement in the work-affect, by the use of alumina grains.

As an alternating measure, it has been proposed and partially put into practice to remove the work-affected layer by a chemical or electrical process. These methods, unfortunately, cannot suitably apply to polycrystal ferrite because different surfaces of crystal exhibit different degree of chemical removal to cause a large step or difference at the grain boundaries.

In case of a single crystal ferrite, it is an effective measure for removing the work-affected layer to effect a chemical etching after the polishing or to subject the ferrite simultaneously to both of polishing by grains and chemical etching by employing an acidic polishing liquid. In such a case, however, the surface roughness is rather degraded. As to the Ni-Zn ferrite, the method effective solely to the single crystal cannot apply, since no practical method for growing a single crystal Ni-Zn ferrite has not been developed yet.

The chemical method involves further problems, one of which concerns the dullness of edge of the mirror-finished surface. This is not so serious when the amount of removal is not so large. However, the precision of the shape is deteriorated considerably if a so-called deep etch is effected. The second problem concerns the presence of impurities in the ferrite. The ferrite is a material which generally contains an extremely large amount of impurities as compared with, for example, Si. Some of these impurities cannot be removed even by chemical etching. For instance, in case of the Mn-Zn ferrite, it is extremely difficult to perfectly prevent the elution of platinum of crucibles. The precipitation of the impurities at the boundary grains is inevitable also in the polycrystal ferrite such as hot-press ferrite. Generally, these impurities cannot be removed by the etchant for ferrite, so that they remain the form of protrusions after an etching. Needless to say, these protrusions hinders the formation of fine gap of an order of 0.3 $\mu$m or less and, accordingly, deteriorates the precision of the gap length. The third problem resides in the fact that, in polishing the ferrite as the core of the magnetic head, the gap opposing surfaces which are constituted by composite structure of ferrite and glass are partially etched to leave only the glass portion in the form of projections. In such a case, it is necessary to conduct a further etching to remove the glass. The repeated etching imposes a greater chance of occurence of faults.

These problems of the prior art are fairly overcome by the method of the invention as will be understood from the following description of the preferred embodiments.

Figure 3:
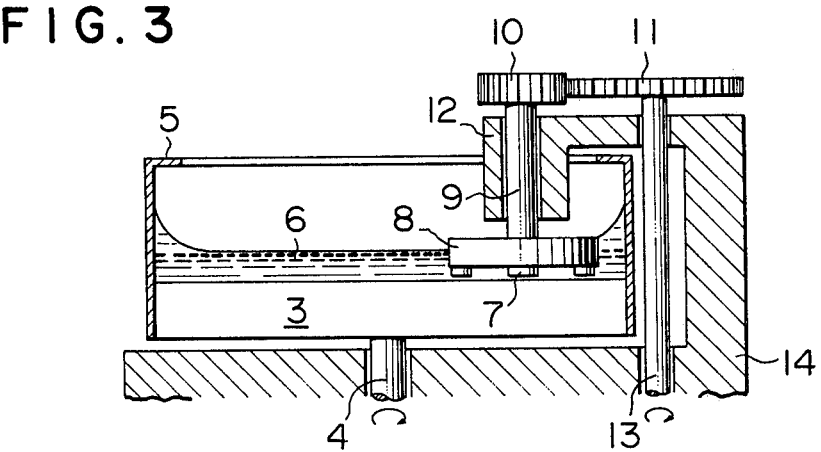
FIG. 3 is a side elevational view of an example of apparatus suitable for use in carrying out a working method of the invention.

Referring first to FIG. 3 showing a polishing apparatus suitable for use in carrying out the method of the invention, a disc-shaped lap 3, arranged to be rotated by means of a rotary shaft 4, has a peripheral wall 5 constituting a liquid container containing a treating liquid 6 having fine polishing grains thereby to permit a wet polishing therein.

A ferrite 7 as the work is bonded to a specimen holder 8 by means of a thermally softenable resin, while the specimen holder 8 is coupled to a rotary shaft 9 supported by a bearing 12, so as to be rotatively driven through a rotary drive shaft 13, a gear 11 and a gear 10. The rotary shaft 9 is not restrained from moving axially in the bearing 12. In the stationary states, the ferrite 7 contacts the lap 3 due to its weight. However, as the lap 3 and the specimen holder 8 start to rorate, a fluid bearing of a dynamic pressure is formed between the lap 3 and the ferrite 7 to make the specimen holder 8 to float. If necessary, an additional pressure may be applied by means of a spring from the upper side of the gear 10, or an additional load may be applied. The apparatus as a whole is supported by a base 14 having a high rigidity to permit a rotational movement at a high precision.

It is considered that, according to the invention, the treating liquid suspending the polishing fine grains collides with the work surface as it flows as the working fluid of a dynamic-pressure fluid bearing along the work surface, as will be mentioned later, so as to repeat the removal of extremely small mass of the work due to an elastic fracture of the latter. Thus, the method of the invention inherently has a low efficiency, and the change of size caused by the working is extremely small. This means that the method of the invention naturally requires an effective pre-treatment.

Needless to say, the industrial applicability and the utility of the invention will be greatly enhanced if a conventional polishing method can be used as the pretreatment. A typical conventional polishing apparatus broadly used is a flat-surface polishing apparatus of conditioning ring type, e.g. LAP MASTER manufactured by CRANE PACKING COMPANY of U.S.A. In contrast to the forcible driving type apparatus as shown in FIG. 3 in which the flatness of the work surface is affected also by precision of the rotation of the specimen holder, the lap surface solely rules the flatness of the work in the above-mentioned apparatus of the conditioning ring type. Thus, the latter apparatus is quite suitable for use in polishing of flat surface at a higher precision. The role of the conditioning ring is to correct the deterioration of the lap surface caused by the polishing work and to cause a rotation of the specimen holder around its own axis.

In the method of the invention, since the work does not directly contact the lap, the wear of lap, i.e. the deterioration of the flatness of the lap surface, is negligibly small, so that the correction of flatness by the conditioning ring is completely unnecessary. The conditioning ring undesirably contacts the lap surface to degrade the latter to make it impossible to obtain the expected quality of the mirror-finished surface. Therefore, according to the invention, the work is polished by the ordinary polishing apparatus of the conditioning ring type in the earlier stage of the working, and, in the latter part of the working, is bonded to a specimen holder and polished in accordance with the method of the invention. A practical example of the apparatus for carrying out the method of the invention will be described hereinunder with reference to FIG. 4.

A lap 24 is fixed to a rotary shaft 26. Cylindrical walls 23, 23' are detachably secured to the inner and outer peripheries of the lap 24 to constitute a treating liquid cell containing a treating liquid 25 having polishing fine grains. Ferrites 22 as the work are bonded to a disc-shaped specimen holder 21 used in the preceding step by means of a heat softenable resin or the like. The specimen holder 21 in turn is detachably secured to a rotary cylinder 20. In the described embodiment, the rotary cylinder 20 is provided with a bottom to prevent the treating liquid 25 from coming thereinto. This arrangement is intended for preventing the contamination of the treating liquid 25. The specimen holder 21 and the rotary cylinder 20 may be constructed unitarily with each other if such an arrangement does not cause any inconvenience in the preceding step.

On the other hand, the base 27 of the apparatus carries a plurality of holders 16. The number of the holders 16 corresponds to the number of the sets of the specimen holder 21 and the rotary cylinder 20, the number being typically 4 (four).

The holder 16 is movable along a holder fixing shaft 15 secured to the base 27, and can be fixed at any desired position by means of a clamp 17. An arm 18 is unitarily secured to the holder 16. A pair of rollers 19 are attached to the end of the arm. As the working of the preceding step is over, the specimen holder 21 to which the works 22 are attached is attached to the rotary cylinder 20 after the removal of the deposits such as polishing agent, and is then placed gently in the treating liquid cell. In this state, the holder 16 is fixed at an upper portion of the holder fixing shaft 15 and the rollers 19 are placed outside the rotary cylinder 20. It is preferred that the arm 18 is swung together with the holder 16 so as not to hinder the working.

Subsequently, the holder 16 is released from the clamp 17 to move the rollers 19 into the rotary cylinder 20 down to a level as close as possible to the bottom of the latter. Then, clamp 7 is actuated again to fix the position of the holder 16, i.e. the position of the rollers 19. As the lap 24 starts to rotate from this position, the rollers 19 make contact with the inner surface of the rotary cylinder 20 to restrain the rotary cylinder 20 from rotating around the axis of the shaft 26 together with the lap 24. In consequence, the specimen holder 21 revolves relative to the lap 24. At the same time, the specimen holder 21 makes a rotation around its axis due to the difference of speed among the works 22 arranged in the radial direction of the lap 24. This rotation is smoothly assisted by the rollers 19 contacting the inner surface of the rotary cylinder 20.

The above-explained relative movement between the lap 24 and the works 22 causes the treating liquid 25 to produce there between a state of the dynamic-pressure fluid bearing so that the lap 24 and the work 22 are held out of contact with each other. The principal feature of the invention resides in that the working proceeds while maintaining the work and the lap out of contact with each other, which is compared in contrast to the conventional working or polishing method. In order to stably realize the state of the dynamic-pressure fluid bearing, it is effective to increase the flowing velocity of the treating liquid or to enhance the viscosity of the liquid.

Figure 4:
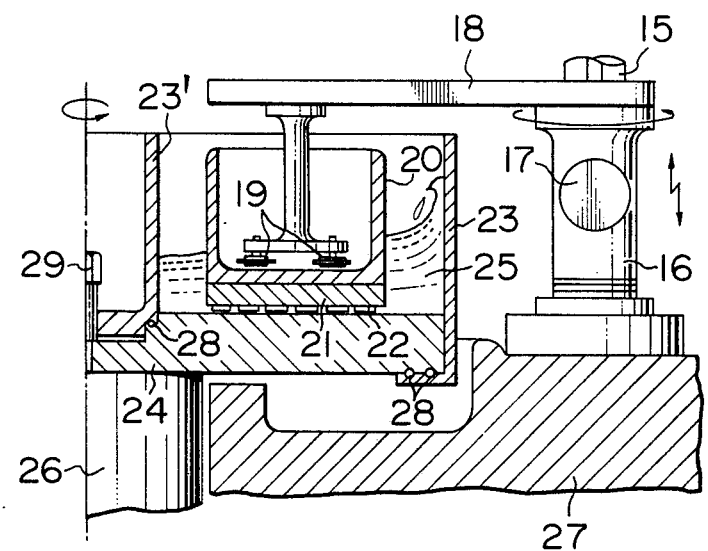
FIG. 4 is a partial sectional view of an example of apparatus suitable for use in carrying out the method of the invention.
Figure 5:
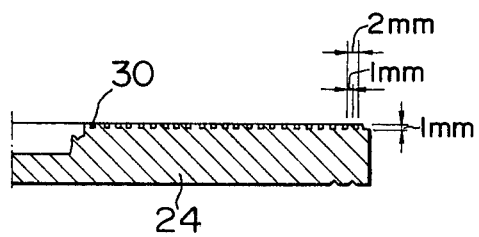
FIG. 5 is a sectional view of an essential part of an apparatus suitable for use in carrying out the working method of the invention.

More practically, as a direct measure for increasing the flowing velocity, it is possible to enhance the rotational speed of the lap or the specimen holder. In the flat-surface polishing apparatus, however, a high-speed movement is usually accompanied by a deterioration of the precision and, therefore, is not preferred. In case of an arrangement as shown in FIG. 4, it is an effective measure to increase the flowing velocity to provide grooves 30 in the lap 24, as shown in FIG. 5. In the example shown in FIG. 5, there are provided a plurality of concentric grooves 30 disposed at a pitch of 2 mm, and to have a groove width and depth of 1 mm, respectively. This, however, is not exclusive and the grooves may be formed spirally or in the form of a vortex. In the method of the invention, since the direct contact between the lap and the work is avoided, the affect of the roughness of the lap on the finished surface, which is inevitably caused in the conventional apparatus, can fairly be eliminated. This conveniently permits to use a lap having a comparatively coarse or rough surface, and a dynamic-pressure fluid bearing can be formed even in such a case. The effect becomes remarkable as the roughness of the lap surface exceeds 5 $\mu$m. However, a roughness exceeding 20 $\mu$m makes it difficult to maintain the flatness of the lap surface and, accordingly, cannot provide a good finished surface.

The formation of the mirror-finished surface becomes difficult as solid particles other than the polishing grains come into the treating liquid. It is therefore necessary to pay specific attention for the management of the treating liquid, as well as to maintain a high purity of the atmosphere. The more important factors for ensuring the high quality of the product is however the selection of material of the lap, as well as processing and management of the lap. In the polishing using diamond grains, the flatness of the lap is corrected by means of the grains themselves under the use. There is no significance in definitely determining the initial state of the lap surface. In the method of the invention, however, it is necessary that the flatness is achieved to a certain extent before the use, because the wear in the lap during the polishing work is extremely small. It is also necessary to keep the lap clean from any impurities residing in the lap surface after the processing of the latter.

In order to meet these requirements, the lap is made of a metallic material such as tin, aluminum, brass, stainless steel and the like, and is processed by means of a lathe. Among these metallic materials, the tin can provide the most excellent quality of the finished surface, partly because it is available commercially at a high purity and partly because it is stable chemically.

The treating liquid is a suspension liquid in which fine particles of magnesium oxide is dispersed and suspended in distilled water. The mean particle size is preferably small. Magnesium oxide particles of a grain size in the order of 0.1 μm is available commercially. It is also effective to add an agent for increasing the viscosity, in order to stabilize the aforementioned state of dynamic-pressure fluid bearing. As the agent for increasing the viscosity, glycerol can produce a particularly remarkable effect.

Figure 6:
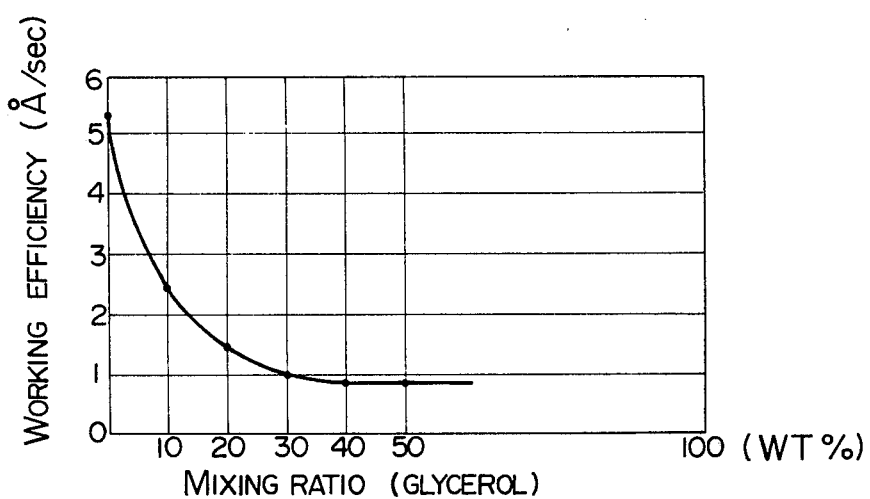
FIG. 6 is a chart showing the relationship between the glycerol content of treating fluid used in the method of the invention and the working efficiency.

FIG. 6 shows how the efficiency of the working is changed by a change in the mixing ratio of glycerol to the distilled water. The data shown in FIG. 6 have been obtained with the ratio of mixing of the polishing grains and the working pressure kept constant. From FIG. 6, it will be seen that the efficiency of the working is lowered as the glycerol content is increased.

Figure 7:
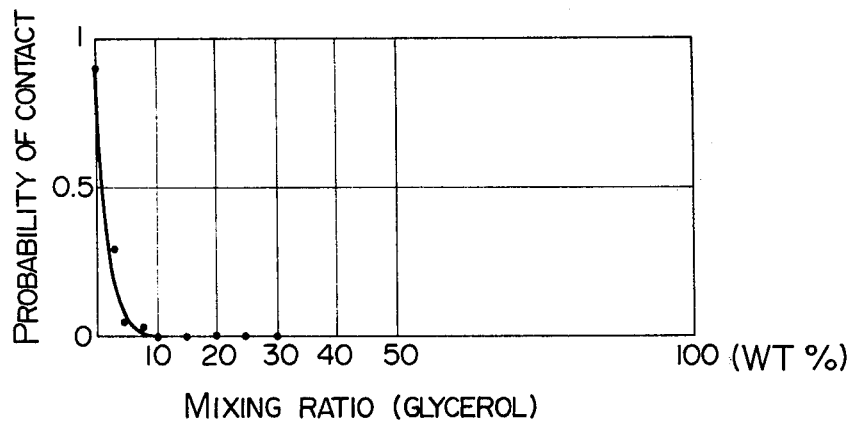
FIG. 7 is a chart showing the relationship between the glycerol content of the treating liquid and contacting factor.

FIG. 7 shows how the probability of contact between the lap and the work is affected by the glycerol content of the treating liquid. The probability of contact is considerably high when the treating liquid contains no glycerol. The rate of contact is drastically lowered when the glycerol content exceeds a certain value. A glycerol content in excess of 10 wt% can eliminate the risk of contact between the work and the lap almost perfectly.

This means that a perfect non-contacting condition, i.e. the state of dynamic-pressure fluid bearing can be obtained by mixing the glycerol (agent for increasing viscosity) in excess of 10 wt%. By maintaining this non-contacting condition, it is possible to effect the polishing solely by the elastic fracture caused by the magnesium oxide, without suffering from scratching which may otherwise be caused by a direct contact with the lap. For avoiding the mutual contact of the work and the lap, the glycerol content is preferably higher than 10 wt% and, from the view point of the efficiency of the working, the glycerol content is preferably not greater than 30 wt%.

In the polishing of gap surfaces of a magnetic head, the prevention of the dullness of edge is of great significance. Namely, the dullness of edge directly leads to an increase of the gap length, resulting in a deterioration of the magnetic characteristic. The allowable value of the dullness of edge at the gap surfaces is preferably 0.01 to 0.02 μm, in case of current video head.

Figure 8:
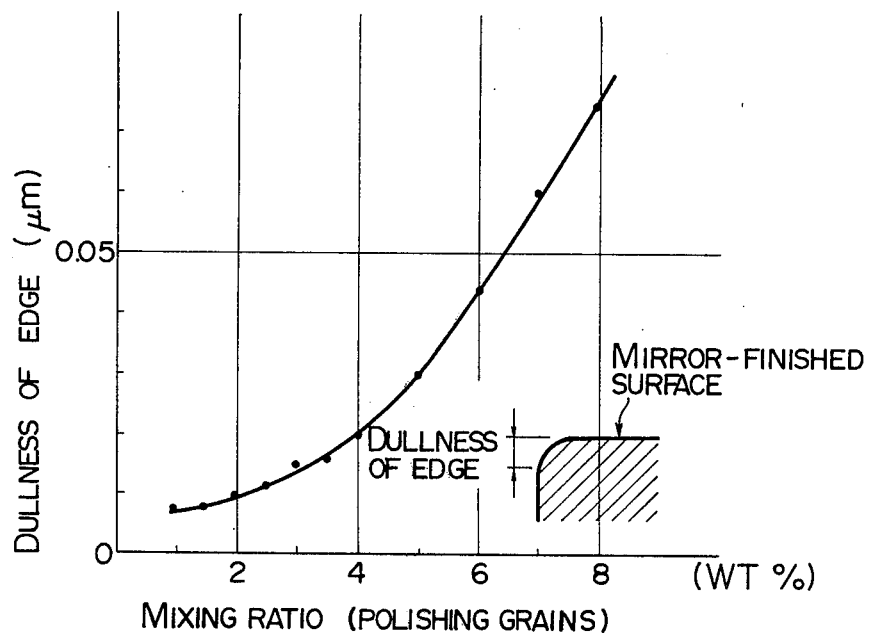
FIG. 8 is a chart showing the relationship between the polishing agent content and dullness of edge in the working method of the invention.

FIG. 8 shows how the mixing ratio of the polishing grains affect the amount of generation of the dullness of edge. It is assumed here that the glycerol content (20 wt%) and working pressure are kept constant.

Figure 9:
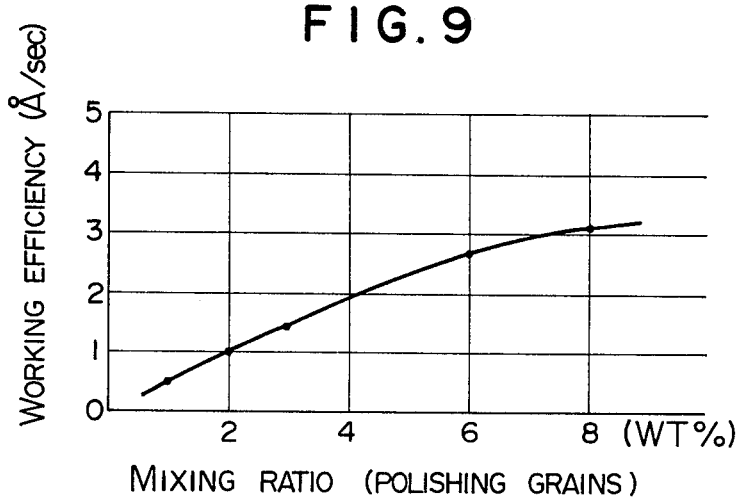
FIG. 9 is a chart showing the relationship between the polishing agent content and the working efficiency.

As will be understood from this Figure, the amount of the dullness of edge is abruptly increased as the polishing grains content exceeds 4%. For avoiding the generation of the dullness of edge, therefore, it is preferred to maintain the polishing grain content at a level not higher than 4%. The lower limit is selected at a practical level from the view point of working efficiency. As will be understood from FIG. 9, a polishing grain content smaller than 1% can provide only an extremely small working efficiency and, therefore, is not practically used.

The working pressure is selected to fall within a range of between 0.2 and 0.3 Kg/cm$^2$ which is usually adopted. In general, a higher working pressure causes a greater dullness of edge, although it can provide a higher efficiency of the working. It is therefore necessary to suitably select the working pressure taking into account the influence of the working pressure on the dullness of edge.

The macroscopic flatness of the worked surface entirely depends on the flatness of the lap surface, as in the case of ordinary polishing method which permits a direct contact between the lap and the work. Namely, a higher quality of the finished surface can be obtained by using a highly-precisely finished flat surface of the lap, also in the method of the invention.

Hereinafter, a description will be made as to the practical examples of the mirror-finishing surfaces conducted in accordance with the method of the invention.

Figure 10:
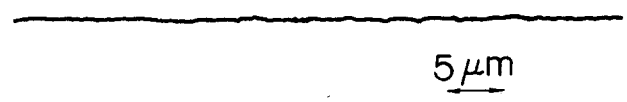
FIGS. 10 and 11 are illustrations of examples of mirror-finished surfaces worked by the method of the invention.

FIG. 10 shows the surface roughness of a Mn-Zn single crystal ferrite. The value of Hmax is not greater than 10 A°. No further mirror-surface will not be obtained, considering that the lattice constant of the ferrite is 8 to 9 A°. The instrument used for this measurement is TALYSTEP manufactured by TAILER HOBSON COMPANY.

Figure 11:
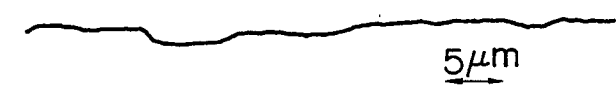

FIG. 11 shows the surface of a Ni-Zn polycrystal ferrite. In this case, steps of 20 to 30 A° is generated at the grain boundary due to the difference of processing speed attributable to the anisotropy of the crystal surface. The surface roughness in the boundary, however, is within 10 A°, also in this case. The step at the grain boundaries was observed to the about 20 A° in case of an Mn-Zn polycrystal ferrite. An reflection electron diffraction pattern, which was taken to investigate the crystallinity at the work surface showed a distinct KIKUCHI line. This tells that the method of the invention provides an equivalent crystallinity to that obtained by a chemical etching.

A troidal core (μ ring) was worked at its side surface, in order to investigate the influence of the work strain on the magnetic permeability (μ').

Figure 12:
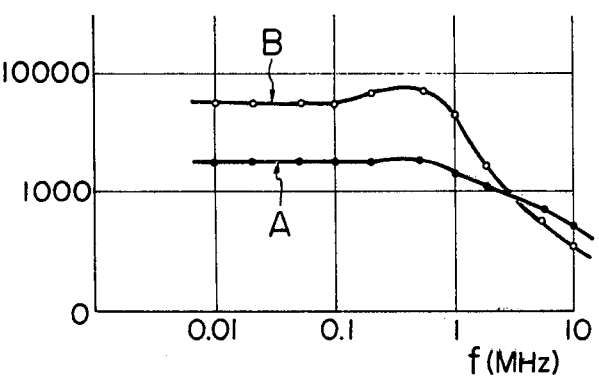
FIG. 12 is a chart showing the frequency characteristic of magnetic permeability $\mu'$ of a $\mu$ ring the side surfaces of which are worked by conventional polishing method.

More specifically, the curve A in FIG. 12 shows the frequency characteristic of μ' obtained by a polishing conducted with diamond grains of grain size of 3 μm, whereas the curve B of the same Figure shows the frequency characteristic obtained after a further chemical etching for removing the work strain effected on the same side of the μ ring. It will be seen from the comparison of these curves that the magnetic characteristic is seriously deteriorated by the presence of the work strain.

Figure 13:
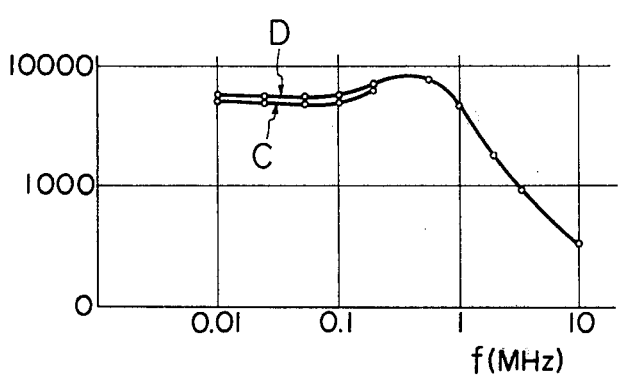
FIG. 13 is a chart showing the frequency characteristic of a magnetic permeability $\mu'$ of $\mu$ ring the side surfaces of which are worked by the method of the invention.

In FIG. 13, the curve C shows the characteristic of μ ring the side surface of which is processed in accordance with the method of the invention, while curve D shows the characteristic observed after a chemical etching on the side surface. It will be understood from the comparison of the curves C and D with each other that the deterioration of the magnetic characteristic is extremely small.

A platinum of 2 to 3 μm, as a mean, was observed in the Mn-Zn single crystal ferrite shown in FIG. 10. The precipitation, however, could be regarded as an extremely small indentation, through an observation with a differentiation-interference type microscope. In the measurement of the surface roughness, the indentations could not be detected because the detecting stylus has a width of about 2.5 μm. This indentation is presumed to have a size of not greater than 50 A° and does not affect materially the formation of the gap. The deterioration of the mirror-finished surface caused by the impurities precipitated in the grain boundaries was not observed at all even in the Ni-Zn polycrystal ferrite shown in FIG. 11.

Figure 14:
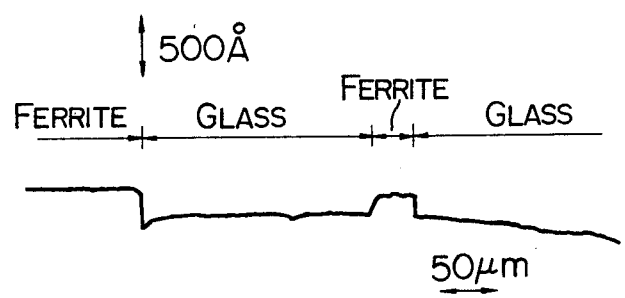
FIGS. 14 and 15 show examples of mirror-finished surfaces worked by the method of the invention.

FIG. 14 shows a work surface having a composite material made of Mn-Zn polycrystal ferrite filled with glass. The glass used in this work is a lead glass having a Vicker's hardness (Hv) of 500 Kg/mm$^2$. A step of about 200 A° is generated at the boundaries between the glass and the ferrrite. This, however, does not cause any inconvenience in the production of the magnetic head gap, because the ferrite portion is projected. In addition, the end portions of the ferrite has a sharpened edge, from which it is understood that the method of the invention permits a mirror-finishing of a high precision of shape, while avoiding dullness of edge of the finished surface.

Figure 15:
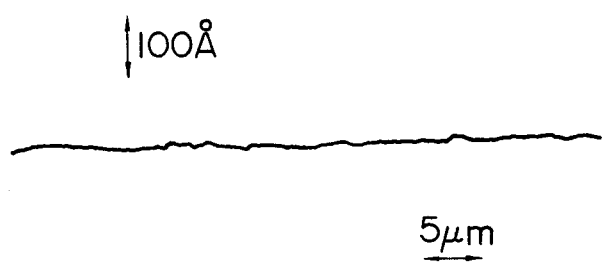

FIG. 15 shows the roughness of the finished surface of a sendust. In this case, almost no grain boundary is observed, although the sendust is a polycrystal metal. The surface roughness is not greater than 20 A°, including even a swell or undulation which is attributable to the influence of the impurities.

The method of the invention was carried out with various kinds of materials, in order to investigate the materials effectively worked by the method of the invention.

As to the metallic material, only few materials were tested because the provision of the perfect mirror surface having no affected layer to metallic materials other than the soudust is only little in need. In general, however, it was confirmed that the softer material provides inferior quality of the mirror-finished surface, and that the stainless steel can be polished to an order of 20 A° in surface roughness.

As to the ceramics, various materials from ferrite to $Al_2O_3$ can be worked at a surface roughness of not greater than 50 A°. The materials having lower Vicker's hardness showed inferior quality of the mirror-finished surface also in the case of ceramics.

One of the major features of the invention resides in the use of magnesium oxide (MgO) particles as the polishing agent. Other polishing agents poses various problems. For instance, hard particles such as of $Al_2O_3$, $SiO_2$, $Cr_2O_3$ and the like failed to provide a surface roughness below 100 A° nor could eliminate the work-affected layer. On the other hand, soft polishing particles such as $Fe_2O_3$, $Fe_3O_4$ and the like caused generation of steps at the grain boundaries to deteriorate the mirror-finished surface of the product when used for polycrystal materials, although they could considerably diminish the work-affected layer. Further soft polishing grains such as $CaCO_3$, ZnO and so forth could provide an extremely small rate of processing, although not zero, and cannot be practically used for industrial purposes. Thus, the MgO particles solely could provide the mirror-finished surface with no work-affected layer, irrespective of whether the material is of single or polycrystal structure.

A video head was produced from the Mn-Zn single crystal ferrite as shown in FIG. 10, and the frequency characteristic of this video head was compared with that of the video head worked by a conventional method. The video head worked by the method of the invention showed a distinctively superior characteristic particularly in the high-frequency range, although no substantial difference was observed in the low-frequency range. More specifically, the video head worked by the method of the invention exhibited a 2 to 3 dB increase of output at 5 MHz (corresponds to 1 μm of recording wave length), over the video head worked by the conventional method. This is attributable to the mirror-finished surface having no work-affected region, offered by the method of the present invention. In addition, faults due to the contamination of the mirror-finished surface, which could never be erased by the conventional method, was not observed during the use of the video head having a highly clean mirror-finished surface worked in accordance with the method of the invention.

As will be understood from the foregoing description, the method of the invention can effectively be used particularly for the working of magnetic materials for magnetic heads, and permits a stable and easy production of magnetic heads having a distinguished performance.

What is claimed is:

1. A polishing method for mirror-finishing the surface of a work with a surface roughness of less than 0.05 μm comprising the steps of: preparing a treating liquid which contains, as a viscosity increasing agent, from 10 wt% to 30 wt% of glycerol and from 1 wt% to 4 wt% of magnesium oxide particles having a grain size in the order of 0.1 μm; and causing a relative movement between said surface of said work and a lap so as to produce therebetween a state of dynamic-pressure fluid bearing sufficient to float said work in said treating liquid, thereby separating the surface of said work from said lap during the polishing process, while said magnesium oxide particles collide with said surface of said work in association with said treating liquid in a flow state to cause elastic fracture, so that said surface of said work is mirror-finished with no work-affected layer by said magnesium oxide particles.

* * * * *